United States Patent [19]

Donaghy

[11] Patent Number: 4,955,675
[45] Date of Patent: Sep. 11, 1990

[54] HINGED PANELS WITH FOAMED-IN-PLACE INSULATION

[75] Inventor: David J. Donaghy, Gowen, Mich.

[73] Assignee: White Consolidated Industries, Inc., Cleveland, Ohio

[21] Appl. No.: 339,157

[22] Filed: Apr. 17, 1989

[51] Int. Cl.$^5$ .............................................. A47B 81/00
[52] U.S. Cl. .................................. 312/214; 312/321.5
[58] Field of Search ............... 312/214, 321.5; 52/743, 52/744; 264/46.5, 46.6

[56] References Cited

U.S. PATENT DOCUMENTS

| | | |
|---|---|---|
| 2,976,577 | 3/1961 | Gould . |
| 3,000,058 | 9/1961 | Thielen . |
| 3,042,780 | 7/1962 | Gursahaney . |
| 3,089,202 | 5/1963 | Pulaski . |
| 3,132,382 | 5/1964 | Magester ............................ 312/214 |
| 3,156,019 | 11/1964 | Dawley . |
| 3,264,047 | 8/1866 | Steiner . |
| 3,338,451 | 8/1967 | Kesling . |
| 3,403,477 | 10/1968 | Light . |
| 4,107,833 | 8/1978 | Knight et al. .................. 264/46.5 X |
| 4,180,297 | 12/1979 | Abrams ................................ 312/214 |

*Primary Examiner*—Joseph Falk
*Attorney, Agent, or Firm*—Pearne, Gordon, McCoy & Granger

[57] ABSTRACT

A hinged door panel for refrigerators and freezers includes a rectangular shell having hinge bearing members mounted on each corner. Each hinge bearing defines a generally cylindrical opening proportioned to receive a hinge pin of a hinge mounted on the main cabinet of the refrigerator or freezer. The inner walls of the hinge pins are formed with a plurality of vent openings which allow gases to escape during the foaming of the insulation. The vent passages are sized so that they freely pass the gases and air contained within the cavity during the foaming but prevent insulating material from entering the hinge pin passage.

11 Claims, 2 Drawing Sheets

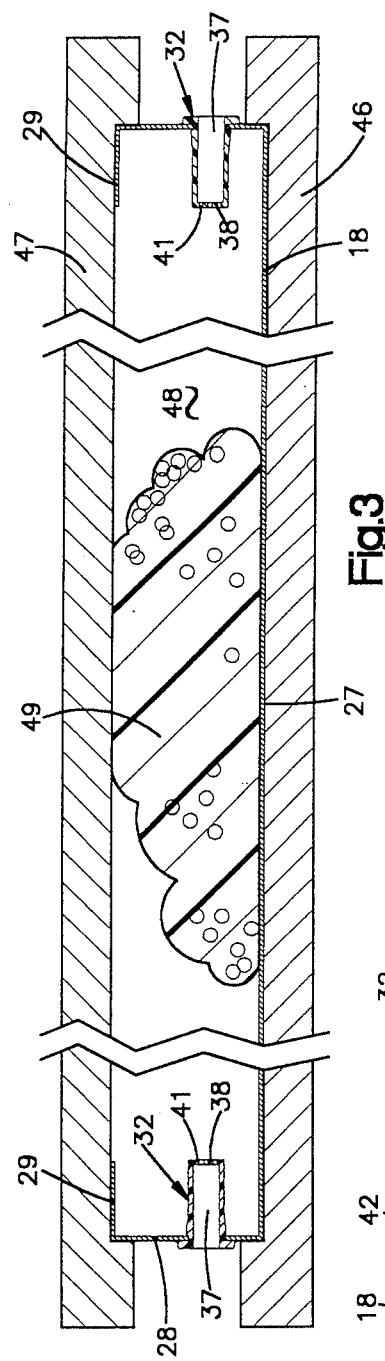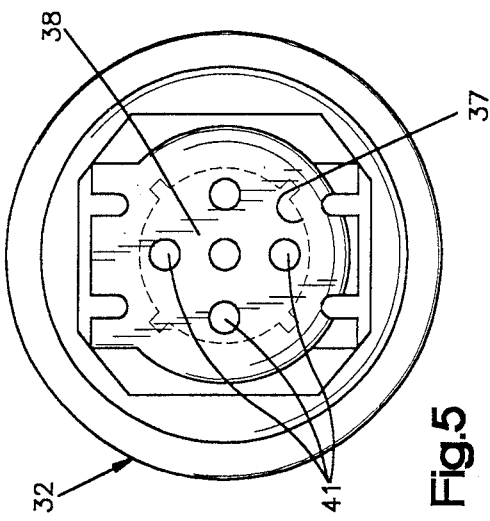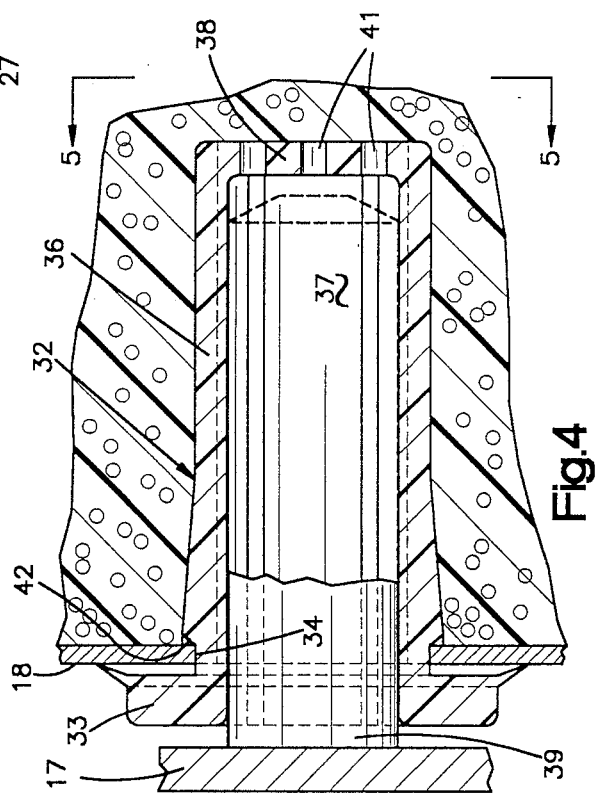

4,955,675

HINGED PANELS WITH FOAMED-IN-PLACE INSULATION

BACKGROUND OF THE INVENTION

This invention relates generally to insulated panels, and more particularly to a novel and improved foamed-in-place, insulated, hinged panel structure particularly suited for use as doors for refrigerators, freezers, and the like and to a novel and improved method of producing such panels.

PRIOR ART

Refrigerators, freezers, and the like provide insulated doors mounted by a hinge structure on the main cabinet of the unit. Usually, such doors include a sheet metal shell providing the exterior surface and a molded plastic liner shaped to provide storage shelves and compartments.

The cavity between the shell and the liner is usually filled with insulation, and in some cases is filled with a foamed-in-place polyurethane foam insulation. Examples of insulated doors and panels having foamed-in-place insulation between the shell and the liner are illustrated in U.S. Letters Pat. Nos. 2,976,577; 3,000,058; 3,042,780; 3,089,202; 3,156,019; 3,264,047; 3,338,415; and 3,403,477.

Proper function of the insulation requires that the insulation extend along the entire door. If the insulation does not provide a full barrier to the transmission of heat, the efficiency of the unit is reduced and undesirable localized zones of condensation may develop.

In order to ensure that the foam extends throughout the cavity or portion thereof requiring insulation, vents are provided to allow the air and gases within the cavity to exhaust and permit the foam to expand fully into the entire cavity or cavity portion where insulation is required.

In the past, openings have been provided in the shell being foamed which are covered by vent tape. Such structure however, requires the installation of the tape, which is not functionally required in the finished panel.

SUMMARY OF THE INVENTION

In accordance with the present invention, a novel and improved panel structure and method of producing same are provided for thermally insulated cabinet structures having hinge means mounted thereon, and which are insulated by foamed-in-place insulation.

The illustrated embodiment is a door panel for refrigerators, freezers, and the like. The panel includes a rectangular sheet metal shell defining a portion of an insulation cavity having four corners Mounted at each corner is a hinge bearing having a generally cylindrical opening which receives hinge pins when the panel is mounted. Each hinge bearing is structured to be snapped into an opening in the shell adjacent to the associated corner. The cylindrical opening is open at its outer end to receive the associated hinge pin. The inner ends of the openings are closed by perforated end walls.

During manufacture, a measured amount of foamable insulation material is deposited in the shell and the assembly is clamped in a form which cooperates with the shell to fully define the cavity requiring insulation. As the foaming occurs, the insulation expands and fills the cavity in a uniform manner. The perforations at each corner of the cavity formed in the hinge bearings allow the air and gas in the cavity to vent out at the corners. This allows the insulation to flow into the corners during foaming and completely fill the insulation cavity, including the corners thereof.

The perforations in the hinge bearings are sized to allow free venting of the gases, such as the air within the cavity, but do not allow the foam to pass into the bearing openings. Therefore in the finished panels, the bearing openings are clear to receive the hinge pins without interference.

After foaming, the insulation provides an insulating barrier which uniformly insulates the entire panel. Therefore, the panel functions efficiently to prevent the passage of heat and condensate producing locations are avoided. Further, the insulation which becomes a rigid foam provides additional support for the hinge bearings and the shell. This permits the use of thinner metal to form the shell.

With this structure, the hinge bearings which are required for the panel's use also serve as the vents during the manufacture. Consequently, the required venting is provided without requiring additional structural members or components in the assembly.

The illustrated panel is foamed with insulation of uniform thickness. This eliminates ripples in the face of the shell and provides a uniform insulation barrier. In typical applications, a separate liner having storage shelves and compartments is mounted on the interior surface of the panel to complete the door structure and the liner covers the exposed insulation surface. With this invention a uniform, high quality structure is provided without requiring separate vent means during the foaming operation.

These and other aspects of this invention are illustrated in the accompanying drawings, and are more fully described in the following specification.

BRIEF DESCRIPTION OF THE DRAWINGS

FIG. 3 illustrates an intermediate point in the production of the panel in which the foam material is deposited within the shell and the assembly is enclosed within a mold;

FIG. 4 is an enlarged, longitudinal section of one of the hinge bearings; and

FIG. 5 is an end view of one of the hinge bearings, illustrating a preferred pattern of vent openings.

DETAILED DESCRIPTION OF THE DRAWINGS

Figure 1:
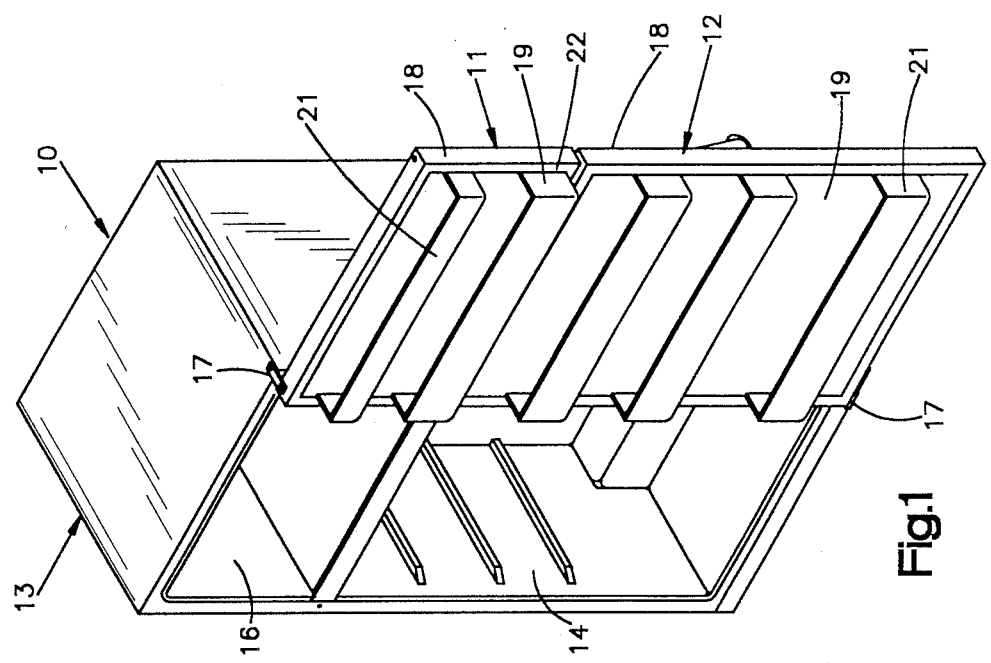
FIG. 1 illustrates a typical refrigerator having doors in accordance with the present invention mounted thereon.

FIG. 1 schematically illustrates a refrigerator 10 having upper and lower insulated doors 11 and 12, respectively. Typically, the refrigerator provides a main cabinet 13 which is divided into a refrigeration compartment 14 and a freezer compartment 16. The upper door 11 is mounted on the cabinet 13 by hinges 17 to close the freezer compartment or provide access thereto as required. Similarly, the lower door 12 is also mounted on hinges 17 and functions to open or close the refrigeration compartment 14.

Each of the doors 11 and 12 provides a sheet metal shell 18 and a liner 19. Typically, the liners 19 are molded plastic and provide shelves or compartments 21. Further, in the illustrated embodiment, the liners are secured to the periphery of the associated shell by screw fasteners which also mount a magnetic gasket 22.

Figure 2:
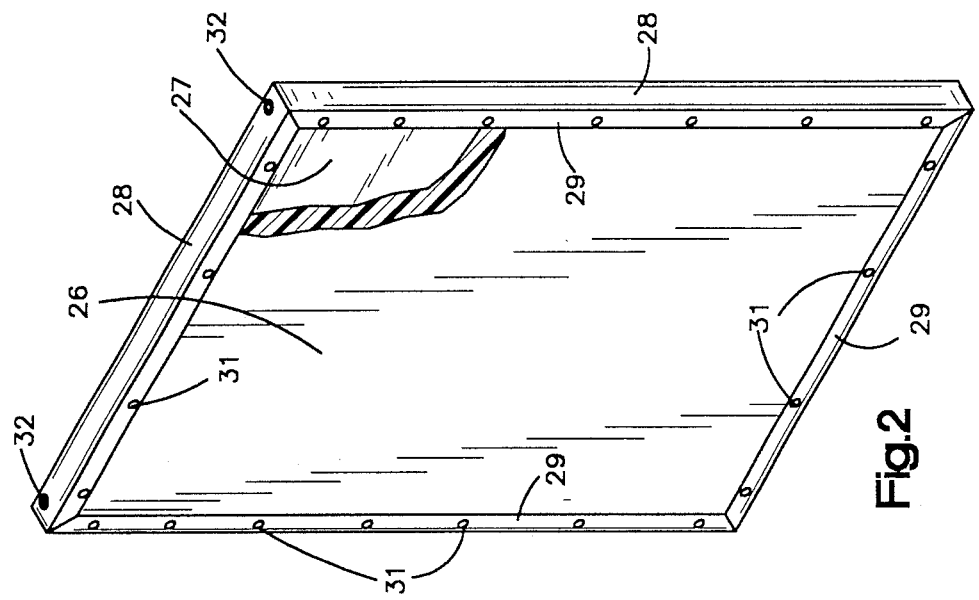
FIG. 2 illustrates the foamed panel prior to the installation of the d liner.

Prior to the installation of the liner and gasket, the shell 18 of each door is provided with foamed-in-place insulation 26. As best illustrated in FIG. 2, the shell is rectangular in shape and provides a planar front face 27. The shell material is bent rearward along each of the four sides to provide the edges 28 of the door. The edges extend from the front face rearwardly to inwardly extending flanges 29, which extend inwardly along the shell along a plane parallel to the plane of the front face 27 but spaced rearwardly therefrom. The shell defines one side and the edges of a cavity which is filled by the insulation 26 during the manufacture of the door.

The shell 18 is preformed prior to the foaming of the insulation and punched to provide openings 31 for screws which mount the liner 19 and gasket 22 on the shell. Also mounted at each of the four corners is a hinge bearing described in detail below. Four hinge bearings 32 are mounted in the shell, with one at each corner, even though only two such hinge bearings are used in a given installation on the main cabinet 13. These four hinge bearings are provided so that any given door can be mounted on the cabinet as either a lefthand opening or a righthand opening door.

The hinge bearings 32 are structured as best illustrated in FIGS. 4 and 5. Since all of the hinge bearings 36 in a given door are identical, only one needs to be described and illustrated in detail. The hinge bearings provide an outer flange 33 which rests against the exterior surface of the shell 18. Extending through the associated opening 34 in the shell is a tubular portion 36 which defines a cylindrical opening 37 extending from an outer open end in the flange 33 to a perforated inner end 38. It is this cylindrical opening that receives a hinge pin 39 provided by the portion of a hinge mounted on the main cabinet 13.

Except for a cluster of small vent passages 41 provided in the inner end wall 38, the hinge bearing 32 is identical in structure with hinge bearings which have been marketed by the assignee of the present invention and which constitute prior art with respect to this invention. Such hinge bearings, however, although mounted in refrigerator and freezer doors having a sheet metal outer shell and an inner plastic molded liner, were not installed in doors insulated with foamed-in-place insulation.

The exterior of the tubular portion 36 adjacent to the flange 33 is non-circular, as best illustrated in FIG. 5. Similarly, the opening 34 in the shell is a non-circular opening sized and shaped to mate with the adjacent portion of the hinge bearing so that the hinge bearing is held in position against rotation. Further, the tubular portion is provided with an outwardly extending shoulder 42 which locks the hinge bearing in place once it is snapped through the opening 34.

In accordance with the present invention, the end wall 38 is formed with a pattern of five small vent holes which vent the corners of the panel during the foaming of the insulation 26.

FIG. 3 illustrates the process of foaming the insulation 26 within the shell at an intermediate point in the foaming operation. When the panel is to be foamed, the shell 18 having the hinge bearings 32 mounted therein at the corners is positioned on the lower platen 46 of a foaming mold. Such mold provides full support of the front face 27 of the shell and the portion of the edges 28 adjacent to the front face.

Initially, the upper platen 47 is not positioned so that the opening within the flanges 29 of the shell is completely open. The shell defines a portion of a cavity 48 which will be filled with the foamed-in-place insulation in the completed door panel. During the foaming process, the upper platen 47 is positioned over the shell and cooperates with the shell to define the entire cavity 48 of the panel.

Prior to installing the upper platen 47, a measured amount of foamable insulating material 49 is placed within the shell at the center thereof. This amount is established to be sufficient to completely fill a cavity 48 at the completion of the foaming operation. Various foam materials may be used; however, typically, the foamable material is polyurethane.

As soon as the foamable material 49 is placed in the shell, the upper platen 47 is clamped in place to support the flanges 29 and the portion of the edges 28 adjacent thereto, and also to close the cavity 28.

As the insulation material 49 foams out along the cavity, the air within the cavity is displaced through the vent openings 41 at each corner of the panel. Since the foam tends to expand in a symmetrical manner, the side edges are engaged between the corners prior to the filling of the corners and the last portion of the panel filled by the foam is at the corners themselves. Therefore, the location of the vent openings 41 adjacent to the corners ensures that all of the gases within the cavity 48, including the air initially within the cavity and any gases which may be released during the foaming process, are adequately vented at the corners.

The vent openings 41 are sized so that they freely pass the gases from the cavity but do not allow the foamable material to pass through the openings 41 into the cylindrical opening of the hinge bearing.

In the illustrated embodiment, the openings 41 are arranged in a pattern as best illustrated in FIG. 6, including a center opening and four additional openings 41 symmetrically arranged around the central opening 41. By providing a plurality of small vent openings 41 at each of the corners, substantial flow rates can be achieved even though the individual vent openings are small enough to prevent the passage of the foam. The multiple openings do not provide any significant restrictions to the venting of the gases from the cavities 48. In the event that one of the openings becomes clogged by any small particle or small piece of debris within the cavity, the remaining openings function to provide the necessary venting operation.

In the illustrated embodiment each of the hinge bearings is provided with five vent openings having a diameter of 0.040 inch. Also, the end wall 38 is about 0.047 inch thick, so each of the vent openings 41 has a length of 0.047 inch. With such size and length of vent openings, it has been found that, although the gases freely vent from the cavity, the foamable insulating material does not progress through the vent openings. Therefore, after the foaming of the panel, the pivot opening or central opening 37 in each hinge bearing is clear to receive a hinge pin 39.

Because the panel is properly vented, the finished insulation material foamed-in-place completely fills the cavity 48 and provides a uniform insulation barrier preventing the flow of heat and preventing the existence of localized zones of insufficient insulation, which could cause spots of condensate collection and reduced efficiency.

Because the foam is of uniform thickness, a substantially uniform pressure gradient exists along the entire panel during the foaming operation and the outer face or front face 37 of the panel is completely smooth and devoid of ripples which often exist in foamed-in-place panels in which the foam extends into the irregular shape of the liner, as illustrated in some of the patents cited above.

In order to provide convenient separation between the upper platen 47 and the adjacent foam within the cavity 48 after the foaming operation is completed, a suitable release coating can be provided on the platen. Alternatively, a sheet of plastic material can be placed along the interface between the upper platen and the foaming material when the upper platen is moved to the closed position. Such plastic can be of a type which is not adhered to by the foam or, if desired, can remain on the insulation in the completed door panel.

With this invention, a foamed-in-place panel is provided in which proper and complete venting is achieved without requiring the addition of any panel component not required for other purposes. Since the hinge bearings are required as a structural feature of the finished panel, and since the hinge bearings incorporate the venting system, the venting is achieved at a minimum expense.

Although the preferred embodiment of this invention has been shown and described, it should be understood that various modifications and rearrangements of the parts may be resorted to without departing from the scope of the invention as disclosed and claimed herein.

What is claimed is:

1. An insulated hinge panel for thermal cabinets comprising a polygonal shell having corners and defining at least part of a cavity, hinge bearings mounted in said shell adjacent to said corners, said hinge bearings extending into said cavity and defining a generally cylindrical passage adapted to receive and journal a hinge pin, said cylindrical passage being open at an outer end exterior of said shell and substantially closed at its inner end by an inner end wall, and insulation foamed in place filling said cavity including said corners, said hinge bearings providing at least one vent opening through which gases within said cavity are vented while said insulation is foamed so that said foam substantially fills said corners, said at least one vent opening being sized and shaped to allow gases to vent while preventing said foam insulation from entering said cylindrical passage.

2. An insulated hinge panel as set forth in claim 1, wherein each hinge bearing provides a plurality of vent openings sized sufficiently small to prevent passage therethrough of foam insulation.

3. An insulated hinge panel as set forth in claim 2, wherein said vent openings are formed in said inner end wall of said hinge bearings.

4. An insulated hinge panel as set forth in claim 2, wherein said vent openings are about 0.040 inch in diameter and have a length of about 0.047 inch.

5. An insulated hinge panel as set forth in claim 1, wherein said panel is a refrigerator door mounted on a refrigerator by hinge pins extending into said cylindrical passages.

6. An insulated hinge panel as set forth in claim 5, wherein said door includes a liner providing shelves and secured to said shell adjacent to the periphery thereof.

7. An insulated hinge panel as set forth in claim 6, wherein said insulation is substantially uniform in thickness.

8. A refrigerator comprising a main cabinet, insulated doors mounted on said cabinet by hinges, said door including a polygonal shell having corners and defining at least part of a cavity, hinge bearings mounted in said shell adjacent to said cylinders, said hinge bearings extending into said cavity and defining a generally cylindrical passage, a pair of hinge pins mounted on said main cabinet extending into at least two of said cylindrical passages supporting said door on said main cabinet for pivotal movement between an open position and a closed position, said cylindrical passages being substantially closed at their inner ends by inner end walls formed with vent openings therein, and insulation foamed-in-place filling said cavity including said corners, said vent openings being sized and shaped to allow gas to vent while preventing said foam insulation from entering said cylindrical passages 9. A method of providing insulated panels having hinge bearings therein comprising forming a shell of sheet material shaped to define at least a portion of a polygonal insulation cavity having corners, providing hinge bearings having a substantially cylindrical opening extending from an open end to an inner end closed by an inner end wall, providing a plurality of vent openings in said hinge bearings sized to permit venting of gases from said cavity while preventing insulation material from entering said passage, mounting said hinge bearings in said shell adjacent to said corners, and introducing foaming insulation material into said cavity which expands to fill said cavity substantially to said corners.

10. A method as set forth in claim 9, including closing said shell and foaming insulation in a mold which cooperates with said shell to define said insulation cavity until said foam insulation fills said cavity.

11. A method as set forth in claim 10, including forming said vent openings in said inner end walls of said hinge bearings.

* * * * *